(12) United States Patent
Rho et al.

(10) Patent No.: US 11,018,379 B2
(45) Date of Patent: May 25, 2021

(54) ELECTRODE, SECONDARY BATTERY USING SAME, AND METHOD FOR MANUFACTURING ELECTRODE

(71) Applicant: AMOGREENTECH CO., LTD., Gimpo-si (KR)

(72) Inventors: Seung Yun Rho, Hwaseong-si (KR); In Yong Seo, Seoul (KR); Ju Hyung Kim, Incheon (KR); Su Yeon Lee, Gimpo-si (KR); Seung Gon Park, Cheonan-si (KR); Dong Woo Kim, Cheonan-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 222 days.

(21) Appl. No.: 16/333,809

(22) PCT Filed: Sep. 19, 2017

(86) PCT No.: PCT/KR2017/010217
§ 371 (c)(1),
(2) Date: Mar. 15, 2019

(87) PCT Pub. No.: WO2018/084431
PCT Pub. Date: May 11, 2018

(65) Prior Publication Data
US 2019/0260091 A1 Aug. 22, 2019

(30) Foreign Application Priority Data
Nov. 1, 2016 (KR) .................. 10-2016-0144421

(51) Int. Cl.
*H01M 10/42* (2006.01)
*H01M 4/04* (2006.01)
(Continued)

(52) U.S. Cl.
CPC ............ *H01M 10/42* (2013.01); *H01M 4/04* (2013.01); *H01M 4/13* (2013.01); *H01M 4/139* (2013.01);
(Continued)

(58) Field of Classification Search
CPC ...... H01M 10/42; H01M 2/1673; H01M 4/04; H01M 4/13; H01M 4/139; H01M 4/1391; H01M 50/46
See application file for complete search history.

(56) References Cited

U.S. PATENT DOCUMENTS

2007/0202407 A1* 8/2007 Eberman ............... C01G 53/50
429/231.3
2011/0318642 A1* 12/2011 Nishiyama ........... H01M 4/667
429/231.8
(Continued)

FOREIGN PATENT DOCUMENTS

JP 2014060122 4/2014
KR 20030093252 12/2003
(Continued)

OTHER PUBLICATIONS

International Search Report—PCT/KR2017/010217 dated Dec. 27, 2017.

*Primary Examiner* — Olatunji A Godo
(74) *Attorney, Agent, or Firm* — Cantor Colburn LLP

(57) ABSTRACT

Provided are an electrode capable of preventing separation of a short-circuit prevention layer since the short-circuit prevention layer, which is made of a heat-resistant polymer fiber, can be attached with high binding force when formed on the surface of the electrode, in the case that an active material layer includes a predetermined amount of polyvinylidene fluoride (PVdF) as a binder; a secondary battery using the same; and a method of manufacturing the electrode. The electrode includes: an electrode current collector;

(Continued)

an active material layer formed on the electrode current collector; and a short-circuit prevention layer formed on the active material layer, wherein the short-circuit prevention layer includes a porous polymer fiber web having a plurality of pores through accumulation of ultrafine fibers of a heat-resistant polymer material, and the active material layer includes PVdF as a binder.

12 Claims, 4 Drawing Sheets

(51) Int. Cl.
*H01M 4/1391* (2010.01)
*H01M 4/62* (2006.01)
*H01M 4/13* (2010.01)
*H01M 4/139* (2010.01)
*H01M 50/46* (2021.01)

(52) U.S. Cl.
CPC ........... *H01M 4/1391* (2013.01); *H01M 4/62* (2013.01); *H01M 4/621* (2013.01); *H01M 50/46* (2021.01)

(56) References Cited

U.S. PATENT DOCUMENTS

| | | | | |
|---|---|---|---|---|
| 2012/0003545 A1* | 1/2012 | Lee | ................... | C23C 18/1254 |
| | | | | 429/246 |
| 2013/0236766 A1* | 9/2013 | Seo | ................... | H01M 2/1653 |
| | | | | 429/144 |
| 2014/0127570 A1* | 5/2014 | Dandrea | ................ | H01G 11/38 |
| | | | | 429/211 |
| 2015/0333310 A1* | 11/2015 | Choi | ................... | H01M 2/1686 |
| | | | | 429/145 |

FOREIGN PATENT DOCUMENTS

| | | |
|---|---|---|
| KR | 20080013208 | 2/2008 |
| KR | 20120046091 | 5/2012 |
| KR | 20140120269 | 10/2014 |
| KR | 20160006766 | 1/2016 |
| WO | 2010058990 | 5/2010 |
| WO | 2011002205 | 1/2011 |

* cited by examiner

ELECTRODE, SECONDARY BATTERY USING SAME, AND METHOD FOR MANUFACTURING ELECTRODE

TECHNICAL FIELD

The present disclosure relates to a secondary battery, and more particularly, to an electrode for a secondary battery capable of preventing a short circuit phenomenon of the electrode, a method of manufacturing the same, and a secondary battery using the same.

BACKGROUND ART

A lithium secondary battery generates electric energy by oxidation and reduction reactions when lithium ions are intercalated/deintercalated at a positive electrode (that is, a cathode) and a negative electrode (that is, an anode). The lithium secondary battery is manufactured by using a material capable of reversibly intercalating/deintercalating lithium ions as an active material of the positive electrode and the negative electrode, and filling an organic electrolytic solution or a polymer electrolyte between the positive electrode and the negative electrode.

The basic function of a separator of the lithium secondary battery is to separate the positive electrode and the negative electrode to prevent a short circuit. Furthermore, it is important to maintain high ion conductivity by sucking the electrolyte necessary for the battery reaction.

A secondary battery including a lithium ion secondary battery and a lithium ion polymer battery having a high energy density and a large capacity must have a relatively high operating temperature range and the temperature is raised when the secondary battery is continuously used in a high rate charge/discharge state. Thus, the separators to be used for these secondary batteries are required to have higher heat resistance and thermal stability than those required for ordinary separators.

As a material for the separator, a polyolefin-based microporous polymer membrane such as polypropylene or polyethylene or a multi-membrane thereof is usually used. Conventional separators have the drawback that a sheet-like separator also shrinks with clogging of the pores of the porous membrane due to internal short-circuiting or heat generation due to overcharging, because the porous membrane layer is in the form of a sheet or film. Therefore, when the sheet-like separator shrinks due to internal heat generation of the battery and contracts, the missing portion caused by the contract of the separator directly contacts the positive electrode and the negative electrode, resulting in ignition, rupture and explosion.

In addition, the film-like separator causes an unfastened space between the negative electrode and the film at the time of overcharging, and lithium ions that cannot enter the negative electrode accumulate at the surface of the negative electrode, that is, in an unfastened space between the negative electrode and the film. As a result, lithium dendrite extracted as lithium metal is formed. Such a lithium dendrite may have a problem that the positive electrode and the negative electrode are in contact with each other through the film-like separator, and at the same time side effect reactions occur between the lithium metal and the electrolyte, and the battery is ignited and exploded due to heat generation and gas generation resulting from the side effect reactions.

Meanwhile, Korean Patent Application Publication No. 10-2008-13208 (Patent Document 1) discloses a heat-resistant ultrafine fibrous separator formed by electrospinning and made of ultrafine fibers of a heat-resistant polymer resin capable of swelling in an electrolytic solution together with ultrafine fibers of a heat-resistant polymer resin having a melting point of 180° C. or higher or having no melting point, a method of producing the same, and a secondary battery using the same.

Conventionally, a polyolefin-based film type separator or a film type separator made of a nanofiber web as disclosed in Patent Document 1 has been manufactured in a state of being separated from an electrode and then inserted between a positive electrode and a negative electrode, to thereby cause a problem of lowering assembly productivity.

That is, a high degree of alignment accuracy is required during assembly by inserting the film type separator between the positive electrode and the negative electrode, and the manufacturing process is troublesome, and when the impact is applied, the electrode is pushed to cause a short circuit.

Particularly, in order to construct a large-capacity battery for an electric vehicle, when stacking a plurality of unit cells in a stacked manner, a bicell or a full cell adopts a stack-folding type structure of a folded structure using a continuous separation film of a long length. Accordingly, there is a drawback that the assembly process is complicated and the wettability at the time of impregnation of an electrolyte solution is low.

Also, a separator composed of a porous ceramic layer in which particles of a ceramic filler are combined with a heat-resistant binder has been proposed in the past in order to stably prevent an internal short-circuit between electrodes even at a high temperature. The ceramic layer has high safety against internal short circuit and is coated and adhered on an electrode plate, so there is no problem of shrinking or melting at the time of internal short circuit.

However, when ceramic slurry is cast into an active material of a negative electrode or a positive electrode to form a thin film, a lithium secondary battery having a porous ceramic layer (i.e., a ceramic separator) is formed uniformly in a uniform thickness over a whole area without desorbing a ceramic material. In this case, a very high process precision is required and a crack occurs when the battery is assembled by laminating the negative electrode and the positive electrode, and when the coated ceramic is desorbed, there is a problem that the ceramic particles cause the performance deterioration.

The use of the above ceramic separator affects the movement of lithium ions during charging and discharging, and in particular, in the case of a high output battery, it may act as a cause of deterioration of battery performance Korean Patent Application Publication No. 10-2016-006766 (Patent Document 2) discloses a heat-resistant separator having a reduced heat shrinkage ratio by forming a ceramic coating layer by coating ceramic slurry made of a ceramic material and a binder on one surface or both surfaces of a polyolefin-based film type separator so as to improve a heat-resistant characteristic. However, there is a problem that a manufacturing process for forming ceramic material uniformly over the entire area without desorption requires a very high process precision. Furthermore, Patent Document 2 has caused a factor of cost increase by using a ceramic material of high purity.

Furthermore, in Korean Patent Application Publication No. 10-2012-0046091 (Patent Document 3), there has been proposed an electrode assembly in which a separator is formed on one or both surfaces of a positive or negative electrode where a porous polymer web layer made of a mixture of a heat-resistant polymer or a heat-resistant polymer, a swellable polymer, and inorganic particles in an ultrafine fibrous form is laminated on the separator, or a non-porous polymer film layer made of a polymer capable of swelling in an electrolyte solution and capable of conducting electrolytic ions covers the negative electrode.

In the electrode assembly of Patent Document 3, since the non-porous polymer film layer formed on the surface of the electrode affects the movement of lithium ions, it may act as a cause of battery performance deterioration particularly in the case of a high output cell.

DISCLOSURE

Technical Problem

The present inventors have found that, when a porous film made of a heat-resistant polymer fiber is formed on the surface of a negative electrode or a positive electrode, shorting between the positive electrode and the negative electrode can be prevented from occurring even if the temperature inside the battery rises and shrinkage of a separator occurs, and the migration of lithium ions is not disturbed by the high porosity and the uniform pore distribution of the porous film, so that deterioration of the cell performance does not occur.

In addition, when the heat-resistant polymer coating layer is formed on the surface of the electrode, the electrode active material cast on the electrode current collector of the negative electrode or the positive electrode is pressed to complete the electrode and then form the heat-resistant polymer coating layer on the electrode surface. In this case, it has been found that peeling may occur due to poor bonding strength.

Therefore, to solve the above problems, it is an object of the present disclosure to provide an electrode that can prevent separation of a short-circuit prevention layer since the short-circuit prevention layer, which is made of a heat-resistant polymer fiber, can be attached with high binding force when the short-circuit prevention layer is formed on the surface of the electrode, in the case that an active material layer includes a predetermined amount of polyvinylidene fluoride (PVdF) as a binder; a secondary battery using the same; and a method of manufacturing the electrode.

Another object of the present disclosure is to provide an electrode that can prevent separation of a short-circuit prevention layer by forming the short-circuit prevention layer, which is made of a porous polymer fiber web of a heat-resistant polymer fiber by using an electrospinning method before an electrode active material slurry is cast, dried, and compressed, and simultaneously by performing thermocompression; a secondary battery using the same; and a method of manufacturing the electrode.

Another object of the present disclosure is to provide an electrode in which a short-circuit prevention layer made of a porous polymer fiber web of heat-resistant polymer fibers is formed on the surface of the electrode with a high bonding force, thereby preventing short-circuiting between a positive electrode and a negative electrode even if battery cells are overheated to thus improve stability; a secondary battery using the same; and a method of manufacturing the electrode.

Another object of the present disclosure is to provide an electrode capable of preventing a micro short circuit due to separation of a micro active material by integrally forming a short-circuit prevention layer on an electrode surface, and a secondary battery using the electrode.

Another object of the present disclosure is to provide a secondary battery which has small heat shrinkage, an excellent ionic conductivity, an excellent adhesion to an electrode, excellent cycle characteristics in a battery configuration, a high capacity, and a high output.

Another object of the present disclosure is to provide an electrode in which a separator is manufactured in a state in which the separator is separated from the electrode and then inserted between a positive electrode and a negative electrode to assure high alignment accuracy when assembled, and which can prevent short-circuiting even if the electrode is pushed due to impact applied after being assembled, and a secondary battery using the same.

Technical Solution

According to an aspect of the present disclosure, an electrode for a secondary battery includes: an electrode current collector; an active material layer formed on the electrode current collector; and a short-circuit prevention layer formed on the active material layer, wherein the short-circuit prevention layer includes a porous polymer fiber web having a plurality of pores through accumulation of ultrafine fibers of a heat-resistant polymer material, and the active material layer includes polyvinylidene fluoride (PVdF) as a binder.

The content of the PVdF in the active material layer may be 5 to 7% by weight (wt %) based on the solid content of the slurry for preparing a positive electrode active material layer or a negative electrode active material layer.

When the content of the PVdF is less than 5.0 wt %, desorption of the short-circuit prevention layer may occur due to low adhesive force at the time of bending, but when the content of the PVdF is more than 7 wt %, a battery capacity may decrease due to an increase in the resistance and a decrease in the content of the active material.

In addition, the active material layer may further include polytetrafluoroethylene (PTFE) as a binder.

The active material layer and the porous polymer fiber web may be simultaneously thermally compressed and bonded to each other.

The heat-resistant polymer material may have a melting point of 180° C. or higher.

The ultrafine fibers may have a diameter ranging from 100 nm to 1.5 µm. Also, the thickness of the porous polymer fiber web may be 3 µm to 4 µm and the porosity thereof may be 40% to 80%.

According to another aspect of the present disclosure, a negative electrode for a secondary battery includes: a negative electrode current collector; a negative electrode active material layer formed on the negative electrode current collector; and a short-circuit prevention layer formed on the negative electrode active material layer, wherein the short-circuit prevention layer includes a porous polymer fiber web having a plurality of pores through accumulation of ultrafine fibers of a heat-resistant polymer material, the negative electrode active material layer includes polyvinylidene fluoride (PVdF) as a binder, and the content of the PVdF in the negative electrode active material layer is 5 to 7 wt %.

According to another aspect of the present disclosure, a secondary battery includes: a positive electrode; a negative electrode; and a separator disposed between the positive electrode and the negative electrode, wherein at least one of the positive electrode and the negative electrode is formed of the electrode for the secondary battery.

According to another aspect of the present disclosure, there is provided a method of manufacturing an electrode, the method including: preparing a slurry including an electrode active material having polyvinylidene fluoride (PVdF) as a binder; casting a prepared slurry on at least one surface of an electrode current collector to form an electrode active material layer; dissolving a heat-resistant polymer material in a solvent to prepare a spinning solution; forming a porous polymer fiber web on which heat-resistant polymer fibers are accumulated by electrospinning the spinning solution on the cast electrode active material layer; and thermally compressing the electrode active material layer cast on the electrode current collector and the porous polymer fiber web to form a short-circuit layer on the surface of the electrode.

The content of the PVdF in the active material layer may be 5 to 7 wt % based on the solid content of the slurry for preparing the electrode active material layer.

The thermally compressing may be a roll pressing method.

The method of manufacturing an electrode according to the present disclosure may further include a drying step for adjusting the solvent and moisture remaining on the surface of the porous polymer fiber web to control the strength and porosity of the web before the thermally compressing.

In addition, the short-circuit prevention layer may be a porous polymer fiber web having a plurality of pores formed by filling the heat-resistant polymer fibers in irregularities and gaps on the surface of the electrode active material layer. As a result, a concave-convex structure corresponding to a concavo-convex structure of the surface of the electrode active material layer is formed between the short-circuit prevention layer and the electrode active material layer, so that more rigid bonding is achieved.

The spinning solution may further include a swellable polymer in addition to the heat-resistant polymer material.

The preparing the slurry including the electrode active material having PVdF as the binder, may include: preparing an active material powder by putting NCM and LMO as an active material in a milling machine, and performing a grinding process together with zirconia balls in which the active material powder is mixed with the NCM and LMO; preparing a mixed powder by dry grinding the NCM and LMO mixed active material powder, PTFE, and SUPER-P® Li (super-P Li) as a conductive material in a milling machine; prepare a PVdF solution by dispersing/dissolving the PVdF in NMP (N-methyl pyrrolidone); and preparing a positive electrode slurry by mixing the prepared PVdF solution and the mixed powder.

The preparing the slurry including the electrode active material having PVdF as the binder, may include: preparing a graphite active material powder by putting two kinds of graphite having different particle sizes as an active material into a milling machine, and performing a grinding process together with zirconia balls; dispersing the prepared graphite active material powder in a solvent by an ultrasonic method; preparing a PVdF solution by dispersing/dissolving PVdF in NMP (N-methyl pyrrolidone); preparing a PVdF/PTFE solution by mixing PTFE with the obtained PVdF solution; and preparing a negative electrode slurry by mixing the prepared PVdF/PTFE solution and graphite dispersed in a solvent.

Advantageous Effects

As described above, in the present disclosure, the electrode active material slurry is cast on the electrode current collector of the negative electrode or the positive electrode, and then the short-circuit prevention layer made of the porous polymer fiber web of the heat-resistant polymer fibers is formed by using the electrospinning method, before being dried and compressed, to then perform thermal compression, so that sufficient bonding is achieved between the electrode and the short-circuit prevention layer, and the short-circuit prevention layer prevents short-circuit between the positive electrode and the negative electrode to improve the stability, even when the battery is overheated.

In this case, when the electrode active material slurry to be cast in the electrode current collector contains polyvinylidene fluoride (PVdF) as a binder to be mixed with the organic solvent, the adhesion force between the electrode active material layer and the short-circuit prevention layer is increased to prevent desorption of the short-circuit prevention layer.

In addition, when polyvinylidene fluoride (PVdF) is contained in the electrode active material layer, the flexibility of the flexible battery is improved.

In addition, in the present disclosure, by forming the short-circuit prevention layer integrally on the surface of the electrode, it is possible to prevent micro short-circuit due to desorption of the fine active material.

Further, the present disclosure has small heat shrinkage, an excellent ionic conductivity, an excellent adhesion to an electrode, excellent cycle characteristics in a battery configuration, a high capacity, and a high output.

In the present disclosure, a separator is manufactured in a state in which the separator is separated from the electrode and then inserted between a positive electrode and a negative electrode to assure high alignment accuracy when assembled, and a short-circuit prevention layer can prevent short-circuiting even if the electrode is pushed due to impact applied after being assembled.

In the present disclosure, since the short-circuit prevention layer is made of the porous polymer fiber web having a high porosity and a uniform pore distribution as compared with the prior art in which ceramic is coated on the surface of an electrode, the performance deterioration can be prevented even at a high output.

In addition, when compared with the conventional ceramic coating technology using a high-purity ceramic, the short-circuit prevention layer using the heat-resistant polymer material is excellent in cost competitiveness.

BEST MODE

Figure 1:
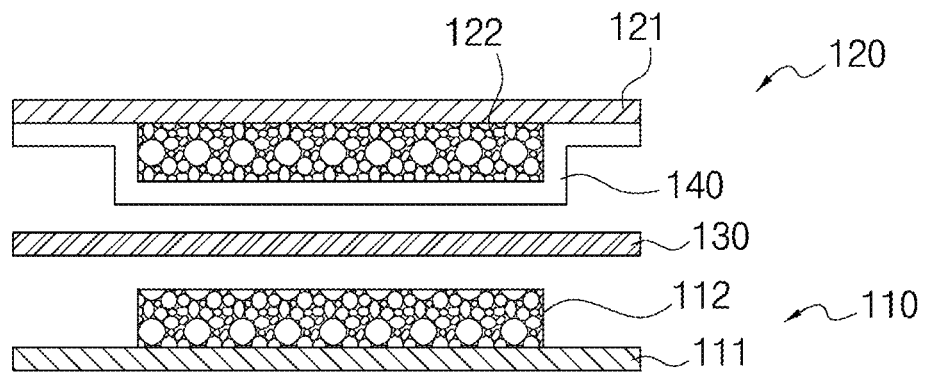
FIG. 1 is a schematic cross-sectional view showing an electrode assembly according to an embodiment of the present invention.

Hereinafter, embodiments of the present invention will be described in detail with reference to the accompanying drawings. The sizes and shapes of the components shown in the drawings may be exaggerated for clarity and convenience.

Referring to FIG. 1, an electrode assembly will be described when a secondary battery according to an embodiment of the present invention forms a full cell.

Referring to FIG. 1, according to an embodiment of the present invention, an electrode assembly 100 for a secondary battery is encapsulated in a can or a pouch together with an electrolyte to constitute a secondary battery, and includes a positive electrode 110, a negative electrode 120, and a separator 130.

The positive electrode 110 includes a positive electrode collector 111 and a positive electrode active material layer 112. The negative electrode 120 includes a negative electrode collector 121 and a negative electrode active material layer 122. The positive electrode collector 111 and the negative electrode collector 121 may be realized in the form of a sheet having a predetermined area.

That is, in the case of the positive electrode 110, the slurry of the positive electrode active material is cast and then compressed on one surface of the positive electrode current collector 111 to form the positive electrode active material layer 112, and in the case of the negative electrode 120, the slurry of the negative electrode active material is cast and then compressed on one surface of the negative electrode current collector 121 to form the negative electrode active material layer 122. Here, the active material layers 112 and 122 may be provided for the entire area of the current collectors 111 and 121, respectively, or may be partially provided for some areas thereof.

Figure 2:
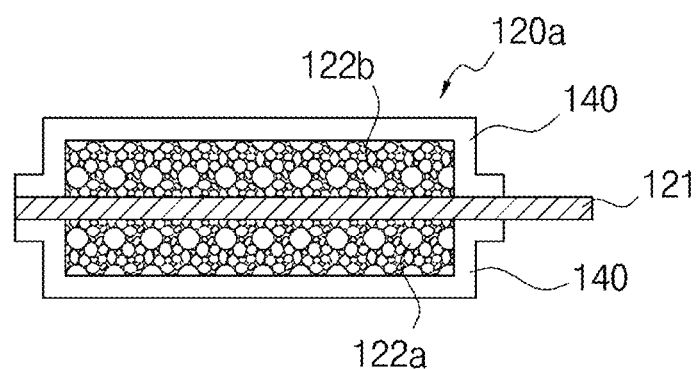
FIG. 2 is a cross-sectional view showing an electrode formed in a bi-cell structure according to an embodiment of the present invention.

The positive electrode 110 may include a pair of electrode active material layers respectively on both sides of the positive electrode current collector to form a bicell, and the negative electrode 120 may include a pair of electrode active material layers respectively on both sides of the negative electrode current collector to form a bicell. FIG. 2 shows a negative electrode having a bicell structure.

Here, the negative electrode current collector 121 and the positive electrode current collector 111 may be made of a thin metal foil or mesh and may be formed of a metal such as copper, aluminum, stainless steel, nickel, titanium, chromium, manganese, iron, cobalt, zinc, molybdenum, tungsten, silver, gold, and alloys thereof.

In addition, the positive electrode current collector 111 and the negative electrode current collector 121 may have a positive electrode terminal and a negative electrode terminal protruding from the respective bodies for electrical connection with an external device.

The positive electrode active material layer 112 includes a positive electrode active material capable of reversibly intercalating and deintercalating lithium ions. Typical examples of such a positive electrode active material include one or a mixture of two or more of a layered compound such as lithium cobalt oxide ($LiCoO_2$) and lithium nickel oxide ($LiNiO_2$), or a compound substituted with one or more transition metals; lithium manganese oxide (LMO) such as a chemical formula $Li_{1+y}Mn_{2-y}O_4$ (where y is 0 to 0.33), $LiMnO_3$, $LiMn_2O_3$, and $LiMnO_2$; lithium copper oxide such as $Li_2CuO_2$; vanadium oxide such as $LiV_3O_8$, $LiFe_3O_4$, $V_2O_5$, and $Cu_2V_2O_7$; Ni-site type lithium nickel oxide represented by a chemical formula $LiNi_{1-y}M_yO_2$ (where M=Co, Mn, Al, Cu, Fe, Mg, B or Ga and y=0.01 to 0.3); lithium manganese complex oxide represented by a chemical formula $LiMn_{2-y}M_yO_2$ (where M=Co, Ni, Fe, Cr, Zn or Ta and y=0.01 to 0.1) or $Li_2Mn_3MO_8$ (where M=Fe, Co, Ni, Cu or Zn); $LiMn_2O_4$ in which a part of Li in the chemical formula is substituted with an alkaline earth metal ion; disulfide compound; carbon such as $Fe_2(MoO_4)_3$, non-graphitized carbon, and graphite carbon; metal complex oxide such as $LixFe_2O_3$ ($0 \leq x \leq 1$), $Li_xWO_2$ ($0 \leq x \leq 1$), $SnxMe_{1-x}Me'_yO_z$ (Me: Mn, Fe, Pb, Ge; Me': Al, B, P, Si, elements of Groups 1, 2 and 3 of the periodic table, halogen; $0 < x \leq 1$; $1 \leq y \leq 3$; $1 \leq z \leq 8$); lithium metal; lithium alloy; silicon-based alloy; tin-based alloy; metal oxide such as $SnO_2$, $PbO_2$, $Pb_2O_3$, $Pb_3O_4$, $Sb_2O_3$, $Sb_2O_4$, $Sb_2O_5$, $GeO_2$, $Bi_2O_3$, $Bi_2O_4$ and $Bi_2O_5$; lithium nickel cobalt manganese (NCM)-based active material; and a material capable of absorbing and desorbing lithium such as Li—Co—Ni-based materials, but are not limited thereto.

In addition, the negative electrode active material layer 122 includes a negative electrode active material capable of reversibly intercalating and deintercalating lithium ions. Such negative electrode materials may be selected from the group consisting of carbon-based negative electrode active materials of crystalline or amorphous carbon, carbon fibers, or carbon composites, tin oxide, lithiated carbon-based negative electrode active materials, lithiated tin oxide, lithium, lithium alloys, and mixtures of two or more thereof. Here, the carbon may be at least one selected from the group consisting of carbon nanotubes, carbon nanowires, carbon nanofibers, graphite, activated carbon, graphene and graphite.

However, the positive electrode active material and the negative electrode active material used in the present invention are not limited thereto, but any of the commonly used positive electrode active material and negative electrode active material may be used.

The separator 130 is disposed between the positive electrode 110 and the negative electrode 120. The separator 130 may be a single layer polyolefin-based porous separator, or a multi-layered polyolefin-based porous separator having a shutdown function.

In addition, the separator 130 may be a high heat-resistant separator with reduced heat shrinkage by coating a ceramic slurry made of a ceramic material and a binder on one side or both sides of a polyolefin-based porous separator to improve the heat resistance of the separator 130 to form a ceramic coating layer.

Figure 3:
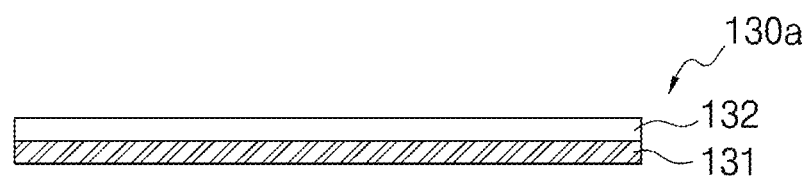
FIGS. 3 and 4 are cross-sectional views illustrating a separator usable in a secondary battery according to an embodiment of the present invention.

Furthermore, as shown in FIG. 3, a separator used in the present invention is formed of an ultrafine fiber phase of a mixture of a heat-resistant polymer and inorganic particles, or a mixture of a heat-resistant polymer, a swellable polymer, and inorganic particles, and may be a separator 130a in which a non-pore polymer film layer 132 serving as an adhesive layer is laminated on a porous polymer fiber web layer 131 serving as an ion-impregnated layer.

Figure 4:
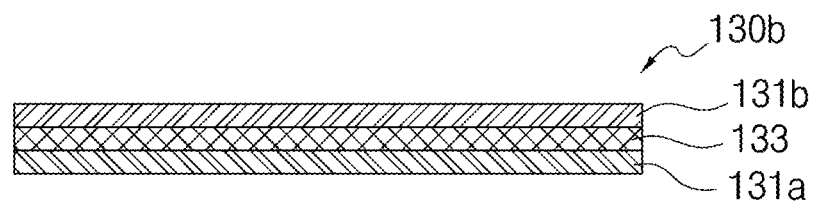

In addition, as shown in FIG. 4, a separator used in the present invention may be a separator 130b including a pair of porous polymer fiber webs 131a and 131b which are laminated on one side or both sides of a porous nonwoven fabric 133 having fine pores as a support in which the pair of porous polymer fiber webs 131a and 131b serve as an adhesive layer and an ion impregnated layer when the pair of porous polymer fiber webs 131a and 131b are adhered to the opposing electrodes, respectively.

For example, the porous nonwoven fabric 133 may employ any one of a nonwoven fabric made of PP/PE fibers having a double structure in which PE is coated on an outer periphery of a PP fiber as the core, a PET nonwoven fabric made of polyethylene terephthalate (PET), and a nonwoven fabric made of cellulose fibers.

The non-pore polymer film layer 132 is obtained by dissolving a polymer capable of swelling in an electrolytic solution and conducting electrolytic ions in a solvent to form a spinning solution, electrospinning the spinning solution to form a porous polymer fiber web made of ultrafine fiber phase, and calendering or heat-treating the porous polymer fiber web at a temperature lower than a melting point of the polymer (for example, PVdF).

The porous polymer fiber web layer 131 is formed by dissolving a mixture of a heat-resistant polymer and inorganic particles or a mixture of a heat-resistant polymer, a swellable polymer, and inorganic particles in a solvent to form a spinning solution, electrospinning the spinning solution onto a non-pore polymer film layer to form a porous polymer fiber web made of an ultrafine fiber phase, and calendering the obtained porous polymer fiber web at a temperature equal to or lower than the melting point of the polymer.

The inorganic particles are at least one selected from the group consisting of $Al_2O_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $SiO_2$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and mixtures thereof.

When the mixture is a mixture of a heat-resistant polymer and inorganic particles, or a mixture of a heat-resistant polymer, a swellable polymer and inorganic particles, the content of the inorganic particles is preferably in the range of 10 wt % to 25 wt % with respect to the total mixture in the case that the size of the inorganic particles is between 10 nm and 100 nm. More preferably, the inorganic particles are contained in the range of 10 wt % to 20 wt %, and the size thereof is in the range of 15 nm to 25 nm.

In addition, when the mixture is a mixture of a heat-resistant polymer, a swellable polymer and inorganic particles, the heat-resistant polymer and the swellable polymer are preferably mixed in a weight ratio ranging from 5:5 to 7:3, more preferably 6:4. In this case, the swellable polymer is added as a binder to facilitate bonding between the fibers.

When the mixing ratio of the heat-resistant polymer and the swellable polymer is less than 5:5 in a weight ratio, the heat resistance is lowered and the high temperature property is not obtained. When the mixing ratio is more than 7:3 in a weight ratio, the strength is lowered and a spinning trouble occurs.

The heat-resistant polymer resin usable in the present invention is a resin which can be dissolved in an organic solvent for electrospinning and has a melting point of 180° C. or higher, and examples of the usable heat-resistant polymer resin may include: any one or mixtures of two or more selected from aromatic polyester such as polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane co-polymers including polyurethane and polyether urethane; cellulose acetate, cellulose acetate butylrate, cellulose acetate propionate, polyester sulfone (PES), and polyether imide (PEI).

The swellable polymer resin usable in the present invention is a resin which swells in an electrolytic solution and can be formed into ultrafine fibers by electrospinning, and for example, the swellable polymer resin may include: polyvinylidene fluoride (PVdF), poly (vinylidene fluoride-co-hexafluoropropylene), perfluoropolymers, polyvinyl chloride, or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene and polystyrene acrylonitrile co-polymers, polyacrylonitrile methyl methacrylate co-polymers; polymethyl methacrylate or polymethyl methacrylate co-polymers, and a mixture thereof.

When a mixed polymer is used, the porous polymer fiber web layer 131 may be formed using a heat-resistant polymer such as polyacrylonitrile (PAN) or a swellable polymer such as PVdF.

The most important role of the separator in the secondary battery is to ensure safety by separating the positive electrode 110 and the negative electrode 120 under any circumstances. Particularly, when the terminal body is operated for a long time, heat is generated in the secondary battery, shrinkage of the separator occurs due to internal heat generation of the battery, and when the battery is shrunk, the positive electrode and the negative electrode may directly contact due to the missing portion caused by shrinkage of the separator. In the case of a film-type separator, a lithium dendrite may be formed.

In order to solve the problem of the conventional secondary battery, the present invention is characterized in that, in addition to the separator 130 separating the positive electrode 110 and the negative electrode 120, a short-circuit prevention layer 140 is formed on the surface of at least one of the positive electrode 110 and the negative electrode 120 in an integral form on the surface of the electrode.

Figure 5:
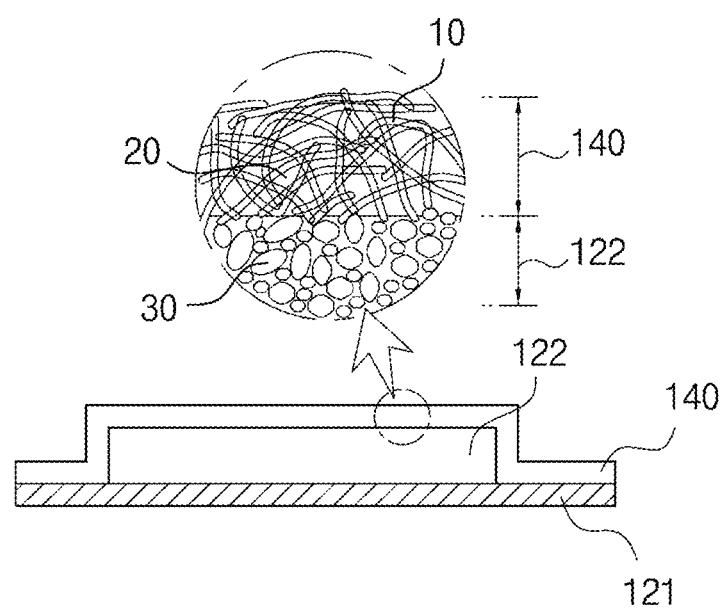
FIG. 5 is an enlarged sectional view showing a state of engagement between an electrode and a short-circuit prevention layer according to an embodiment of the present invention.

As shown in FIG. 5 in the present invention, for example, a negative electrode active material slurry is cast on a negative electrode current collector 121 of a negative electrode to form a negative electrode active material layer 122, and then, a porous polymer fiber web of ultrafine fibers 10 made of a heat-resistant polymer is formed by using an electrospinning method before being thermally compressed, to then complete a short-circuit prevention layer 140 by performing thermal compression.

In addition, the short-circuit prevention layer 140 may be formed by forming a porous polymer fiber web of the ultrafine fibers 10 using an electrospinning method using a mixed polymer obtained by mixing a heat-resistant polymer and a swellable polymer in addition to the heat-resistant polymer alone, and performing thermal compression.

Figure 6:
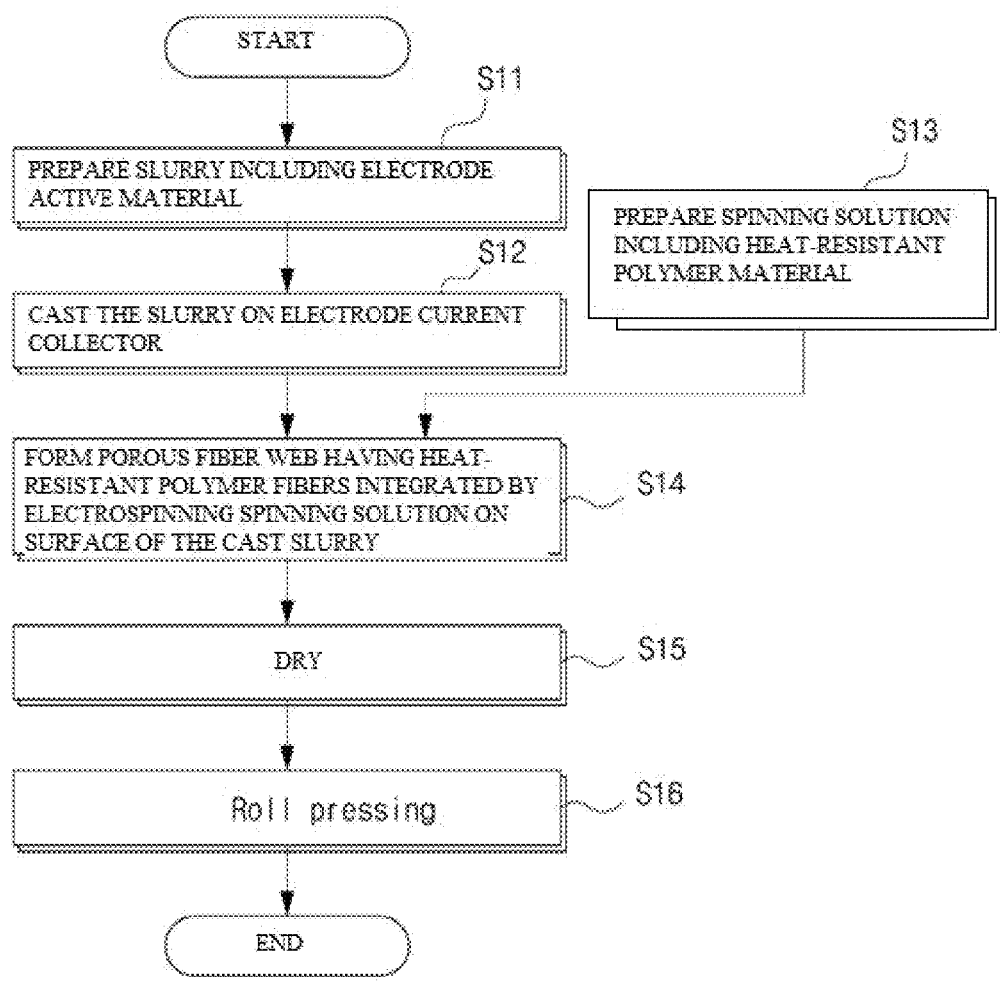
FIG. 6 is a schematic cross-sectional view showing a method of manufacturing an electrode according to an embodiment of the present invention.

Hereinafter, a manufacturing process of forming the short-circuit prevention layer 140 on the surface of the electrode will be described in detail with reference to FIG. 6.

First, the positive electrode 110 or the negative electrode 120 is prepared as follows. Slurry is prepared by mixing an active material, a conductive material, a binder and an organic solvent in a predetermined ratio (S11). The prepared slurry is cast on one side or both sides of an aluminum foil or copper foil or mesh as a positive electrode current collector 111 or as a negative electrode current collector 121 (S12). In this case, the positive or negative electrode current collector 111 or 121 may be a strip-shaped electrode current collector so that a continuous subsequent process can be performed during mass production.

For example, a positive electrode is prepared by casting a slurry composed of a positive electrode active material, a conductive material, a binder (NCM+LMO), super-P lithium and PVdF on an aluminum foil, and a negative electrode is prepared by casting a slurry composed of graphite, super-P lithium and PVdF on a copper (Cu) foil.

In this case, the conductive material may be omitted, in the positive electrode and the negative electrode, if necessary, and other binders other than PVdF may be added as a binder therein.

The solvent can be selectively used depending on the kind of the binder, and for example, organic solvents such as isopropyl alcohol, N-methylpyrrolidone (NMP), and acetone can be used as the solvent.

In particular, since the lithium metal oxide has a property of absorbing moisture, it is preferable to use a binder dissolved in an organic solvent in order to minimize side reaction due to moisture.

In one specific embodiment of the present invention, a binder solution can be prepared by dispersing/dissolving PVdF in NMP (N-methyl pyrrolidone).

The electrode active material and the conductive material may be mixed and dispersed in the binder solution to prepare electrode active material slurry. The electrode active material slurry thus prepared can be transferred to a storage tank and stored until before a coating process. In order to prevent the electrode active material slurry from hardening in the storage tank, the electrode active material slurry can be agitated continuously in the storage tank.

In this case, the content of PVdF added as a binder is preferably 5 wt % to 7 wt % based on the solid content of the slurry for preparing the positive electrode active material layer or the negative electrode active material layer.

Next, after a spinning solution is formed by dissolving PAN as a heat-resistant polymer material in a solvent (S13), the spinning solution is electrospun on the positive or negative electrode active material layers 112 and 122 cast in the positive or negative electrode current collectors 111 and 121, to thereby form a porous polymer fiber web in which the spun ultrafine fibers 10 have been accumulated (S14). The porous polymer fiber web forms a short-circuit prevention layer 140. In this case, the fibers 10 of the heat-resistant polymer material to be electrospun are preferably formed to have a diameter in the range of 100 nm to 1.5 μm.

As shown in FIG. 5, after the slurry containing the negative electrode active material is cast on the negative electrode current collector 121 to form the negative electrode active material layer 122, the surfaces of the active material particles 30 are rough, and have irregularities and gaps before thermal compression is performed.

When the spinning solution is electrospun on the surface of the negative electrode active material layer 122, the ultrafine fibers 10 spun from the spinning nozzle are accumulated on the surface of the negative electrode active material layer 122, and thus a porous polymer fiber web having a large number of pores 20 is formed.

In this case, when the spun ultrafine fibers 10 are accumulated on the surface of the negative electrode active material layer 122, the irregularities and the gaps of the surface of the negative electrode active material layer 122 are filled with the spun ultrafine fibers 10 over a large area, so that the spun ultrafine fibers 10 contact the negative electrode active material layer 122.

Next, a drying step of controlling the strength and porosity of the web by controlling the solvent and moisture remaining on the surface of the porous polymer fiber web by drying the current collector strip having the porous polymer fiber web formed on the positive and negative electrode active material layers 112 and 122 (S15).

Thereafter, the current collector strips are subjected to roll pressing so that the positive or negative electrode active material layer 112 or 122 cast on the positive or negative electrode current collector 111 or 121 and the porous polymer fiber web are simultaneously thermally compressed (S16).

When thermal compression by roll pressing is performed, the adhesion between the particles of the cast slurry and the metal foil is increased, and bonding between the spun ultrafine fibers 10 forming the porous polymer fiber web is performed, so that the rigid coupling between the positive electrode or the negative electrode active material layer 112 or 122 and the porous polymer fiber web, that is, the short-circuit prevention layer 140, is established. That is, as the spun ultrafine fibers 10 are filled in the irregularities and gaps of the surfaces of the active material layers 112 and 122, they are pressed in a state where they are in contact with each other over a wide area, to obtain a high bonding force therebetween. As a result, a concave-convex structure corresponding to a concavo-convex structure of the surface of the active material layer is formed between the short-circuit prevention layer and the active material layer 112 or 122, so that more rigid bonding is achieved.

In this case, the thermocompression bonding temperature is determined depending on the heat-resistant polymer to be used. For example, thermocompression is performed on the porous polymer fiber web at a high temperature of 170 to 210° C. to form a web of an ultrathin film having a thickness of 3 μm to 4 μm, and having a porosity of 40% to 80%.

The short-circuit prevention layer 140 made of the porous polymer fiber web cannot reliably ensure a short circuit between the positive electrode 110 and the negative electrode 120 when the thickness of the short-circuit prevention layer 140 is less than 3 μm, and when the thickness thereof exceeds 4 μm, the performance of the battery can be deteriorated.

In the case of constructing a high-capacity secondary battery, the active material layer is formed as a thick film. In the case of constructing a high-output secondary battery, the active material layer is formed as a thin film. Accordingly, the compression ratio is also set differently.

The short-circuit prevention layer 140 formed of the porous polymer fiber web thermally compressed on the surface of the positive or negative electrode active material layer 112 or 122 may be formed of a heat-resistant polymer material, and thus even if the separator 130 is shrunk, deformed, or shifted due to the overheated battery, the short-circuit prevention layer 140 is not shrunk or deformed. Also, since the short-circuit prevention layer 140 is integrally formed to cover at least one surface of the positive electrode 110 and the negative electrode 120, a short circuit between the positive electrode 110 and the negative electrode 120 can be prevented.

In addition, the short-circuit prevention layer 140 may be formed by simultaneously thermally compressing the cast positive or negative electrode active material layer 112 or 122 and the electrospun porous polymer fiber web. Accordingly, solid bonds are made between the positive or negative electrode active material layer 112 or 122 and the porous polymer fiber web (or the short-circuit prevention layer 140). Therefore, even if the separator 130 cannot reliably separate the positive electrode 110 and the negative electrode 120 due to overheating of the battery, the short-circuit prevention layer 140 prevents a short circuit between the positive electrode 110 and the negative electrode 120, to thereby improve the stability.

As a result, in the present invention, when the separator 130 is manufactured in a state in which it is separated from the electrodes, and then inserted and assembled between the positive electrode 110 and the negative electrode 120, a high alignment accuracy is not required. In addition, it is possible to prevent the occurrence of a short circuit even if the electrode is pushed due to impact applied after assembly.

In addition, in the present invention, by forming the short-circuit prevention layer 140 integrally on the surface of the electrode, it is possible to prevent micro short-circuit due to desorption of the fine active material.

In addition, since the short-circuit prevention layer 140 according to the present invention has a porous web structure having a small heat shrinkage, heat resistance, and high porosity due to being made of a heat-resistant polymer, the short circuit between the positive electrode 110 and the negative electrode 120 is prevented and the ion conductivity is not affected.

In addition, the short-circuit prevention layer 140 of the present invention is integrally formed on the surface of the electrode to prevent the space between the negative electrode and the film-type separator from being formed, thereby preventing lithium ions from accumulating and being precipitated in the lithium metal. As a result, the formation of dendrite on the surface of the negative electrode can be suppressed, to thus improve the stability.

As described above, when the strip-shaped positive electrode 110 and the strip-shaped negative electrode 120 are prepared, a unit positive electrode cell and a unit negative electrode cell are formed while performing a process such as slitting, notching, etc., and then a separator 130 may be inserted between a unit positive electrode cell and a unit negative electrode cell to form one electrode assembly.

Further, a separator may be inserted between the strip-shaped positive electrode 110 and the strip-shaped negative electrode 120, to then be laminated, and then wound, to form an electrode assembly.

After the electrode assembly is assembled, the electrode assembly is inserted into aluminum or an aluminum alloy can or similar container, and then the opening of the can or similar container is closed with a cap assembly, and an electrolyte is injected to manufacture a lithium secondary battery.

Meanwhile, in the case of constructing a large-capacity battery for an electric vehicle, a stack-folding type structure having a structure in which strip-shaped positive electrodes 110 and strip-shaped negative electrodes 120 are successively folded using separators can be easily realized.

In the above-described embodiment, the electrode assembly in which the secondary battery forms a full cell has been described as an example. However, the present invention can also be applied to an electrode assembly having a bicell structure.

In addition, although the lithium ion battery using the electrolyte has been described in the above embodiments, the present invention can also be applied to a lithium polymer battery using a gel-type polymer electrolyte.

Hereinafter, the present invention will be described in detail with reference to the following examples. However, the following examples are intended to illustrate the present invention, and the scope of the present invention is not limited thereto.

<Example 1> Manufacturing of Positive Electrodes

First, 270 g of NCM and 30 g of LMO as active materials were put into a high-speed milling machine such as an attrition mill, 85% by weight (wt %) of zirconia balls were added to the active material, and the mixture was pulverized at 85 RPM and for 24 HR, through a grinding process, to prepare NCM and LMO mixed active material powders. Subsequently, 24.5 g of NCM and LMO mixed active material powder, 1.5 g of PTFE as a conductive liquid, and 1.5 g of super-P Li as a conductive material were placed in a SPEX milling machine, 300 g of zirconia balls were added, and the mixture was pulverized at 500 RPM and for 10 MIN, through a dry type grinding process, to prepare a mixed powder. Subsequently, 1.8 g of PVdF as a binder was dispersed and dissolved in 28 g of NMP (N-methyl pyrrolidone) to prepare a PVdF solution.

Then, the prepared PVdF solution and the powder were mixed in an amount of 50 wt % to prepare positive electrode slurry. The positive electrode slurry was coated on the aluminum foil with a thickness of 200 μm, rolled to have a porosity of 30%, and dried, to prepare a positive electrode of Example 1.

The obtained positive electrode active material layer appeared to contain 83.9 wt % of the active material, 6 wt % of super-P Li, 5 wt % of PVdF, 5 wt % of PTFE, and 0.1 wt % of unavoidable impurities.

Comparative Example 1

A positive electrode was prepared in the same manner as in Example 1 except that the content of PVdF as a binder was 3 wt %, 1 wt %, and 0 wt %, and instead, the content of the active material was increased to prepare a positive electrode of Comparative Example 1.

<Example 2> Manufacturing of Negative Electrodes

First, 270 g of graphite having a particle size of 20.7 μm and 30 g of graphite having a particle size of 3.4 μm as an active material were put in a high-speed milling machine such as an attrition mill, zirconia balls were added in an amount of 85 wt % based on the active material, and the mixture was pulverized for 3 HR, through a grinding process, to prepare a graphite active material powder. 89 g of the obtained graphite active material powder was dispersed in 300 g of NMP as a solvent by an ultrasonic dispersion method for 3 HR to prepare a graphite dispersion solution.

Subsequently, 6 g of PVdF as a binder was dispersed and dissolved in 100 g of NMP (N-methyl pyrrolidone) to prepare a PVdF solution. Then, 106 g of the obtained PVdF solution and 5 g of PTFE were mixed to prepare a PVdF/PTFE solution.

Thereafter, the graphite dispersion solution in which 111 g of the prepared PVdF/PTFE solution and 389 g of the graphite active material powder were respectively dispersed in NMP was mixed to prepare negative electrode slurry. The negative electrode slurry was coated on the copper foil and rolled so as to have a porosity of 30%, and dried, to prepare a negative electrode of Example 2.

The obtained negative active material layer appeared to contain 94 wt % and 6 wt % of the active material and PVdF, respectively.

Comparative Example 2

A negative electrode was prepared in the same manner as in Example 2 except that the content of PVdF as a binder was 3 wt %, 1 wt %, and 0 wt %, and instead, the content of the active material was increased to prepare a negative electrode of Comparative Example 2.

<Bending Test>

The positive and negative electrode samples of Examples 1 and 2 and Comparative Examples 1 and 2 prepared as described above were bent 10 times, respectively, and then bent portions were photographed by SEM.

Figure 7:
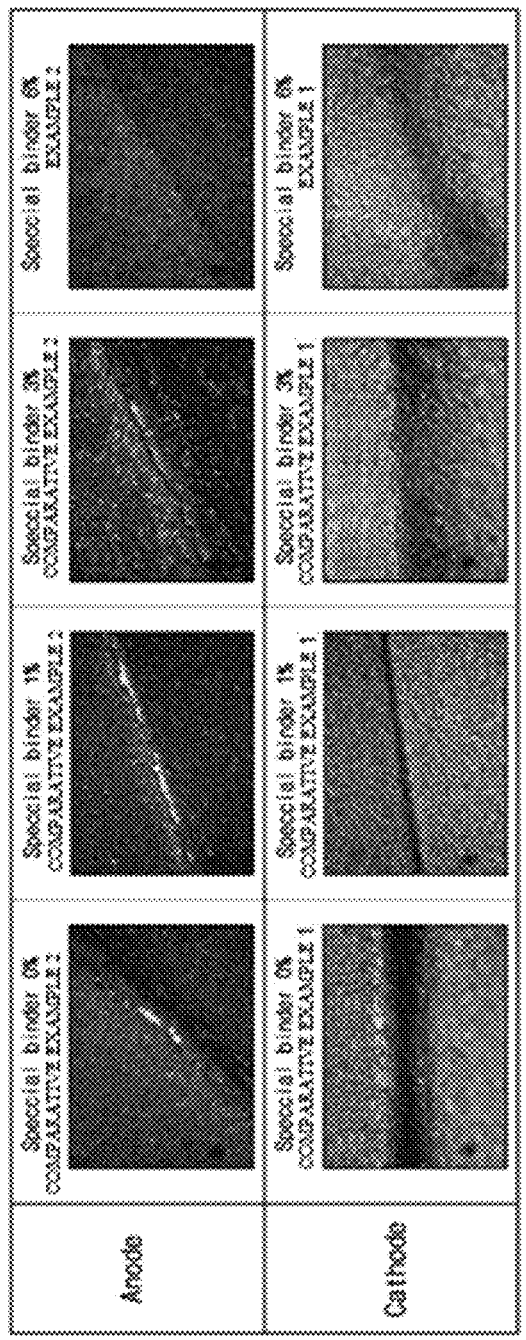
FIG. 7 is an SEM photograph showing an enlarged surface of an active material layer for each content when polyvinylidene fluoride (PVdF) is contained as a binder in a negative active material layer and a positive active material layer, respectively.

FIG. 7 is a SEM photograph showing an enlarged surface of the active material layer for each sample when the negative electrode active material layer or the positive electrode active material layer did not contain PVdF as a binder (that is, contained PVdF of 0 wt %), and contained PVdF of 1 wt %, 3 wt %, and 6 wt %, as a binder, after the results of the bending test.

As shown, in the case of Comparative Example 1 and Comparative Example 2 in which the content of PVdF as a binder is less than 5 wt %, the active material layer is partly eliminated in both the negative electrode (that is, the anode) and the positive electrode (that is, the cathode), and thus there was a problem that the current collector was partly seen. In the case of Examples 1 and 2, no problems occurred in both the negative electrode and the positive electrode.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

When the active material layer contains a predetermined amount of PVdF as a binder, the short-circuit prevention layer made of the heat-resistant polymer fibers is adhered to the surface of the electrode with a high bonding force to prevent peeling of the short-circuit prevention layer. The short-circuit prevention layer is applicable to a secondary battery, particularly a flexible battery, which can prevent a short circuit between the positive electrode and the negative electrode even if the battery is overheated.

What is claimed is:

1. An electrode for a secondary battery, the electrode comprising:
   an electrode current collector;
   an active material layer formed on the electrode current collector, wherein the active material layer comprises:
   a binder including polyvinylidene fluoride (PVdF), and a content of the PVdF is 5 wt % to 7 wt %; and
   a short-circuit prevention layer formed on the active material layer,
   wherein the short-circuit prevention layer comprises a porous polymer fiber web having a plurality of pores, and the porous polymer fiber web is formed of accumulated fibers of a heat-resistant polymer material.

2. The electrode for a secondary battery of claim 1, wherein the binder further comprises: polytetrafluoroethylene (PTFE).

3. The electrode for a secondary battery of claim 1, wherein the porous polymer fiber web has a thickness ranging from 3 μm to 4 μm and a porosity ranging from 40% to 80%.

4. The electrode for a secondary battery of claim 1, wherein the fibers have a diameter ranging from 100 nm to 1.5 μm.

5. A negative electrode for a secondary battery, the negative electrode comprising:
   a negative electrode current collector;
   a negative electrode active material layer formed on the negative electrode current collector, wherein the negative electrode active material layer comprises: a binder including 5 wt % to 7 wt % of polyvinylidene fluoride (PVdF); and
   a short-circuit prevention layer formed on the negative electrode active material layer,
   wherein the short-circuit prevention layer comprises a porous polymer fiber web having a plurality of pores, and the porous polymer fiber web is formed of accumulated fibers of a heat-resistant polymer material.

6. A secondary battery comprising:
   a positive electrode;
   a negative electrode; and
   a separator disposed between the positive electrode and the negative electrode,
   wherein at least one of the positive electrode and the negative electrode comprises the electrode according to claim 1.

7. A method of manufacturing an electrode, the method comprising:
   preparing a slurry including an electrode active material having polyvinylidene fluoride (PVdF) as a binder, wherein a content of the PVdF is 5 wt % to 7 wt % based on the electrode active material layer;
   casting the slurry on at least one surface of an electrode current collector to form an electrode active material layer thereon;
   preparing a spinning solution by dissolving a heat-resistant polymer material in a solvent;
   electrospinning the spinning solution on the electrode active material layer to form a porous polymer fiber web thereon; and
   thermally compressing the porous polymer fiber web to form a short-circuit prevention layer formed of a compressed porous polymer fiber web.

8. The method of manufacturing an electrode of claim 7, before the thermally compressing, further comprising:
   drying a surface of the porous polymer fiber web to control strength and porosity of the porous polymer fiber web.

9. The method of manufacturing an electrode of claim 7, wherein the short-circuit prevention layer includes a plurality of pores.

10. The method of manufacturing an electrode of claim 7, wherein the preparing the spinning solution comprises: preparing a spinning solution by dissolving a heat-resistant polymer material and a swellable polymer material in a solvent.

11. The method of manufacturing an electrode of claim 7, wherein the preparing the slurry comprises:
   preparing an active material powder by putting lithium nickel cobalt manganese (NCM) and lithium manganese oxide (LMO) as an active material in a milling machine, and performing a grinding process together with zirconia balls in which the active material powder is mixed with the NCM and LMO;
   preparing a mixed powder by dry grinding the NCM and LMO mixed active material powder, PTFE, and SUPER-P® Li (super-P Li) as a conductive material in a milling machine;
   preparing a PVdF solution by dispersing and dissolving the PVdF in NMP (N-methyl pyrrolidone); and
   preparing a positive electrode slurry by mixing the prepared PVdF solution and the mixed powder.

12. The method of manufacturing an electrode of claim 7, wherein the preparing the slurry comprises:
   preparing a graphite active material powder by putting two kinds of graphite having different particle sizes as an active material into a milling machine, and performing a grinding process together with zirconia balls;
dispersing the prepared graphite active material powder in a solvent by an ultrasonic method;
preparing a PVdF solution by dispersing/dissolving PVdF in NMP (N-methyl pyrrolidone);
preparing a PVdF/PTFE solution by mixing PTFE with the obtained PVdF solution; and
preparing a negative electrode slurry by mixing the prepared PVdF/PTFE solution and graphite dispersed in a solvent.

* * * * *